(12) United States Patent
Huang et al.

(10) Patent No.: US 10,246,556 B2
(45) Date of Patent: Apr. 2, 2019

(54) POLYIMIDE POLYMER AND POLYIMIDE FILM

(71) Applicant: TAIFLEX Scientific Co., Ltd., Kaohsiung (TW)

(72) Inventors: Ching-Hung Huang, Kaohsiung (TW); Kuang-Ting Hsueh, Kaohsiung (TW); Chiu-Feng Chen, Kaohsiung (TW); Yi-Kai Fang, Kaohsiung (TW); Chun-Cheng Wan, Kaohsiung (TW)

(73) Assignee: TAIFLEX Scientific Co., Ltd., Kaohsiung (TW)

( * ) Notice: Subject to any disclaimer, the term of this patent is extended or adjusted under 35 U.S.C. 154(b) by 34 days.

(21) Appl. No.: 15/678,131

(22) Filed: Aug. 16, 2017

(65) Prior Publication Data

US 2018/0371170 A1   Dec. 27, 2018

(30) Foreign Application Priority Data

Jun. 23, 2017 (TW) .............................. 106121036 A

(51) Int. Cl.
*C08G 73/10* (2006.01)
*C08J 5/18* (2006.01)

(52) U.S. Cl.
CPC ............ *C08G 73/1078* (2013.01); *C08J 5/18* (2013.01); *C08J 2379/08* (2013.01)

(58) Field of Classification Search
USPC .................................. 528/182, 184, 185, 188
See application file for complete search history.

(56) References Cited

U.S. PATENT DOCUMENTS

2004/0266979 A1   12/2004   Oguro et al.
2015/0361222 A1   12/2015   Oka et al.

FOREIGN PATENT DOCUMENTS

| | | |
|---|---|---|
| CN | 106832277 | 6/2017 |
| JP | H105255499 | 10/1993 |
| JP | H111322928 | 11/1999 |
| JP | 2002167433 | 6/2002 |
| JP | 2002226581 | 8/2002 |
| JP | 2006248142 | 9/2006 |
| JP | 2009292940 | 12/2009 |
| JP | 2015134842 | 7/2015 |
| TW | 474956 | 2/2002 |
| TW | I462952 | 12/2014 |
| WO | 2016158825 | 10/2016 |

OTHER PUBLICATIONS

Rohitkumar H. Vora, "Development and properties of designed Ceramlmide materials for advanced high-performance and high-temperature applications" Polyimides and Other High Temperature Polymers, vol. 4, 2007, pp. 69-80.
"Office Action of Taiwan Counterpart Application," dated Dec. 12, 2017, p. 1-p. 5.
"Search Report of Europe Counterpart Application", dated Mar. 27, 2018, p. 1-p. 8.
"Office Action of Japan Counterpart Application," dated Jul. 31, 2018, pp. 1-6.

Primary Examiner — Terressa Boykin
(74) Attorney, Agent, or Firm — JCIPRNET

(57) ABSTRACT

A polyimide polymer is provided. The polyimide polymer includes a repeating unit represented by formula 1.

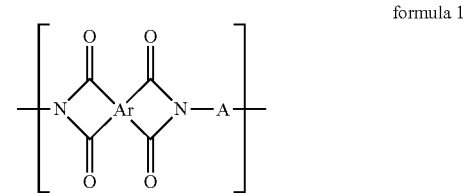

formula 1

In formula 1, Ar is a tetravalent organic group derived from a tetracarboxylic dianhydride containing an aliphatic structure, and A includes

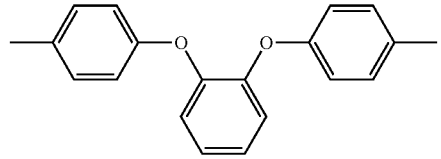

and at least one divalent organic group derived from an aromatic group-containing diamine other than

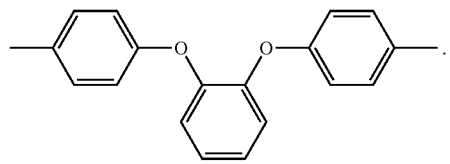

8 Claims, No Drawings

POLYIMIDE POLYMER AND POLYIMIDE FILM

CROSS-REFERENCE TO RELATED APPLICATION

This application claims the priority benefit of Taiwan application serial no. 106121036, filed on Jun. 23, 2017. The entirety of the above-mentioned patent application is hereby incorporated by reference herein and made a part of this specification.

BACKGROUND OF THE INVENTION

Field of the Invention

The invention relates to a polyimide polymer and a polyimide film, particularly to a polyimide polymer and a polyimide film having high transparency.

Description of Related Art

Polyimide resins, due to their excellent thermal characteristics, mechanical characteristics and electrical characteristics, have been largely applied to various fields of automotive materials, aircraft materials, insulating materials, and electric/electronic materials such as liquid crystal alignment films and so on. To achieve good thermal stability, an aromatic group-containing monomer is usually used to prepare a polyimide resin. However, a film prepared from the polyimide resin prepared by using the aromatic group-containing monomer shows brown or yellow, whereby its transparency is reduced and applicability is therefore limited. In the prior art, various studies have been conducted for improving the transparency of polyimide resins. However, with the improvement in transparency, problems such as poor mechanical characteristics or an increased coefficient of thermal expansion are likely to occur. Therefore, to develop a polyimide resin having high transparency, low chromaticity, a low coefficient of thermal expansion, high tensile strength and good elongation is currently still a goal eagerly sought in this field.

SUMMARY OF THE INVENTION

The invention provides a polyimide polymer and a polyimide film having high transparency, low chromaticity, a low coefficient of thermal expansion, high tensile strength and good elongation.

The polyimide polymer of the invention includes a repeating unit represented by formula 1:

formula 1

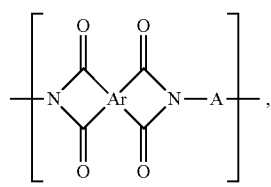

wherein Ar is a tetravalent organic group derived from a tetracarboxylic dianhydride containing an aliphatic structure; and A includes

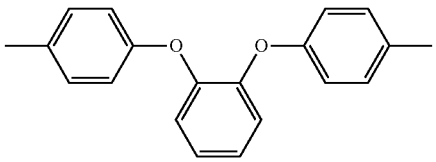

and at least one divalent organic group derived from an aromatic group-containing diamine other than

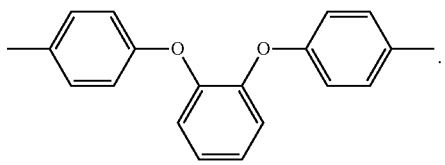

In an embodiment of the invention, the at least one divalent organic group derived from the aromatic group-containing diamine includes at least one of a divalent organic group derived from a diamine having a fluorine-containing aromatic group and a divalent organic group derived from a diamine containing an aromatic group and an aliphatic structure.

In an embodiment of the invention, the diamine having the fluorine-containing aromatic group includes 2,2'-bis(trifluoromethyl)-4,4'-diaminobiphenyl (TFMB), 4,4'-diamino-2,2'-bis(trifluoromethyl)diphenyl ether, 1,4-bis {4-amino-2-(trifluoromethyl)phenoxy}benzene, 2,2-bis {4-(4-aminophenoxy)phenyl}hexafluoropropane, 2,2'-bis[4-(4-amino-2-trifluoromethylphenoxy)-phenyl]hexafluoropropane, or 2,2'-bis(4-aminophenyl)hexafluoropropane.

In an embodiment of the invention, the diamine containing the aromatic group and the aliphatic structure includes 4,4'-diamino-2,2'-dimethyl biphenyl (MTB), 4,4'-diamino-3,3'-dimethyl biphenyl, 2,2'-bis[4-(3-aminophenoxy)pheny]propane, or 4,4'-(1,3-phenylenediisopropylidene) bisaniline.

In an embodiment of the invention, based on total mole number of

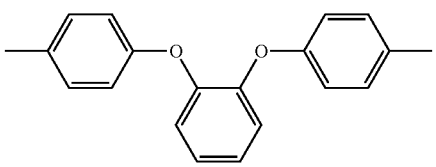

and the at least one divalent organic group derived from the aromatic group-containing diamine, a mole percentage of

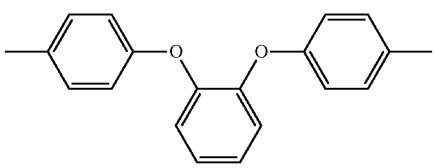

is 10% to 35%.

The polyimide film of the invention includes the aforementioned polyimide polymer.

In an embodiment of the invention, based on a CIE L*a*b* color space, a value of b* of the polyimide film is smaller than 3.5.

In an embodiment of the invention, elongation of the polyimide film is greater than 10%.

Based on the above, the polyimide polymer proposed by the invention is produced by using a specific diamine in combination with at least one aromatic group-containing diamine as diamine monomers and using a tetracarboxylic dianhydride containing an aliphatic structure as a dianhydride monomer. Accordingly, the polyimide polymer and the polyimide film including the same can have high transparency, low chromaticity, a low coefficient of thermal expansion, high tensile strength and good elongation.

To make the above features and advantages of the invention more comprehensible, embodiments are described in detail as follows.

DETAILED DESCRIPTION OF DISCLOSED EMBODIMENTS

In the present specification, a range represented by "a numerical value to another numerical value" is a schematic representation for avoiding listing all of the numerical values in the range in the specification. Therefore, the recitation of a specific numerical range covers any numerical value in the numerical range and a smaller numerical range defined by any numerical value in the numerical range, as is the case with any numerical value and a smaller numerical range thereof in the specification.

In order to prepare a polyimide polymer having high transparency, low chromaticity, a low coefficient of thermal expansion, high tensile strength and good elongation, the invention provides a polyimide polymer achieving the above advantages. In the following, embodiments are described below as examples according to which the invention can be surely implemented.

An embodiment of the invention provides a polyimide polymer including a repeating unit represented by formula 1:

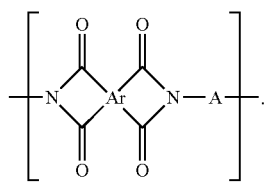

formula 1

In the above formula 1, Ar is a tetravalent organic group derived from a tetracarboxylic dianhydride containing an aliphatic structure. That is, Ar is a residue of the tetracarboxylic dianhydride containing the aliphatic structure other than two carboxylic anhydride groups ($-(CO)_2O$). Herein, the tetracarboxylic dianhydride containing the aliphatic structure is also referred to as a dianhydride monomer.

In the present embodiment, the tetracarboxylic dianhydride containing the aliphatic structure includes an aliphatic tetracarboxylic dianhydride or an alicyclic tetracarboxylic dianhydride. In detail, examples of the aliphatic tetracarboxylic dianhydride include (but are not limited to): 1,2,3,4-butanetetracarboxylic dianhydride; and examples of the alicyclic tetracarboxylic dianhydride include (but are not limited to): cyclobutane-1,2,3,4-tetracarboxylic dianhydride (CBDA), 1,2,4,5-cyclohexanetetracarboxylic dianhydride (HPMDA), 1-carboxymethyl-2,3,5,cyclopentanetricarboxylicacid-2,6:3,5-dianhydride, bicyclo(2,2,2)oct-7-ene-2,3,5,6-tetracarboxylic acid dianhydride, or 1,2,3,4-cyclopentanetetracarboxylic dianhydride.

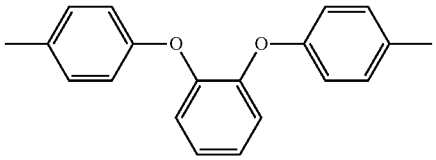

In the above formula 1, A includes and at least one divalent organic group derived from an aromatic group-containing diamine other than

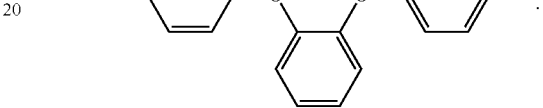

That is, A includes a residue of 1,2-bis(4-aminophenoxy)benzene (hereinafter simply referred to as 1,2,4BAPB) other than two amino groups ($-NH_2$), and a residue of the at least one aromatic group-containing diamine other than two amino groups ($-NH_2$). From another point of view, in the present embodiment, when preparing the repeating unit represented by formula 1, at least two aromatic group-containing diamines may be used, wherein one of them must be 1,2,4BAPB. In the present specification, 1,2,4BAPB and the at least one aromatic group-containing diamine are also referred to as diamine monomers. In other words, in the present embodiment, when preparing the repeating unit represented by formula 1, at least two diamine monomers may be used.

In an embodiment, the at least one divalent organic group derived from the aromatic group-containing diamine includes: at least one of a divalent organic group derived from a diamine having a fluorine-containing aromatic group and a divalent organic group derived from a diamine containing an aromatic group and an aliphatic structure. That is, when preparing the repeating unit represented by formula 1, the diamine monomers used include, in addition to 1,2,4BAPB, at least one of the diamine having the fluorine-containing aromatic group and the diamine containing the aromatic group and the aliphatic structure.

In detail, examples of the diamine having the fluorine-containing aromatic group include (but are not limited to): 2,2'-bis(trifluoromethyl)-4,4'-diaminobiphenyl (TFMB), 4,4'-diamino-2,2'-bis(trifluoromethyl)diphenyl ether, 1,4-bis{4-amino-2-(trifluoromethyl)phenoxy}benzene, 2,2-bis {4-(4-aminophenoxy)phenyl}hexafluoropropane, 2,2'-bis[4-(4-amino-2-trifluoromethylphenoxy)-phenyl]hexafluoropropane), Or 2,2'-bis(4-aminophenyl)hexafluoropropane); and examples of the diamine containing the aromatic group and the aliphatic structure include (but are not limited to): 4,4'-diamino-2,2'-dimethyl biphenyl (MTB), 4,4'-diamino-3,3'-dimethyl biphenyl, 2,2'-bis[4-(3-aminophenoxy)pheny]propane, or 4,4'-(1,3-phenylenediisopropylidene) bisaniline. However, the invention is not limited thereto. In other embodiments, the at least one aromatic group-containing diamine may also include (but is not limited to): 3,4'-diaminodiphenyl ether, 4,4'-diaminodiphenyl ether, 4,4'-diaminodiphenyl sulfone, 3,3'-diaminodiphenyl sulfone, 1,3-bis(4-aminophenoxy)benzene, 1,3-bis(3-aminophenoxy)benzene, 1,4-bis(4-aminophenoxy)benzene, 1,2-bis(4-aminophenoxy)benzene, 9,9'-bis(4-aminophenyl)fluorene, 2,2'-bis(4-(3-aminophenoxy)phenyl) sulfone, or 4-(4-(4-(4-aminophenoxy)phenoxy)phenoxy)benzenamine.

In addition, in the present embodiment, based on total mole number of

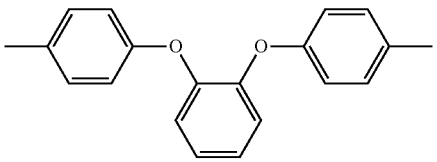

and the at least one divalent organic group derived from the aromatic group-containing diamine, a mole percentage of

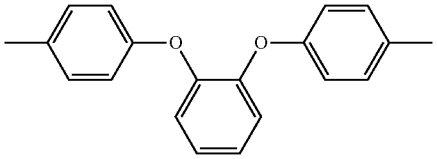

is 10% to 35%, preferably 25% to 35%. In detail, if the mole percentage of

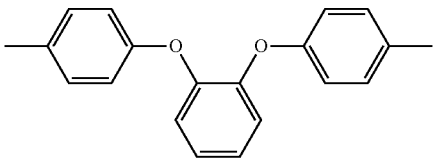

is less than 10%, a polyimide film made from the polyimide polymer has insufficient elongation; if the mole percentage of

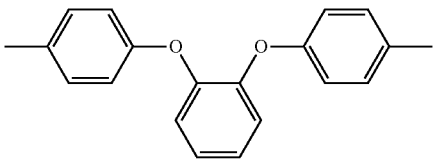

is greater than 35%, the polyimide film made from the polyimide polymer has significantly increased chromaticity.

In addition, as mentioned above, the polyimide polymer including the repeating unit represented by formula 1 is obtained by subjecting a dianhydride monomer and diamine monomers to an imidization reaction, and a method thereof includes the following steps. First of all, in a water bath (room temperature), 1,2,4BAPB and the at least one aromatic group-containing diamine are added to a solvent and mixed together, and the mixture Rums a diamine monomer mixed solution after 1,2,4BAPB and the at least one aromatic group-containing diamine are completely dissolved. In this step, based on total mole number of 1,2,4BAPB and the at least one aromatic group-containing diamine, a mole percentage of 1,2,4BAPB is, for example, 10% to 35%, and a mole percentage of the at least one aromatic group-containing diamine is, for example, 65% to 90%; and the solvent is, for example, N-methyl-2-pyrrolidone (NMP), N,N-dimethylacetamide (DMAc), dimethyl sulfoxide (DMSO), dimethylformamide (DMF), hexamethylphosphoramide, or m-cresol.

Next, in a water bath (room temperature), a dianhydride monomer is added to the diamine monomer mixed solution to perform a reaction, so as to form a polyamide acid solution. In this step, a ratio between the mole number of the dianhydride monomer and the total mole number of 1,2,4BAPB and the at least one aromatic group-containing diamine is, for example, 1:1; the reaction time is, for example, 12 hours to 24 hours; and a solid content of the polyamide acid solution is, for example, 14% to 20%.

Then, in a nitrogen environment, the polyamide acid solution is subjected to an imidization reaction (dehydrating cyclization) so as to form the polyimide polymer including the repeating unit represented by formula 1. In details, the dehydration reaction is, for example, performed as follows. In the absence of a catalyst, the polyamide acid solution is first baked at 120° C. to 140° C. for 10 minutes to 30 minutes to remove the solvent therefrom, and then heated to 300° C. to 350° C. to perform the reaction for 30 minutes to 60 minutes. However, the invention is not limited thereto. In other embodiments, the dehydration reaction may also be performed in the presence of a catalyst.

It is worth noting that, in the present embodiment, by using 1,2,4BAPB and the at least one aromatic group-containing diamine other than 1,2,4BAPB to perform the imidization reaction with the tetracarboxylic dianhydride containing the aliphatic structure to thereby prepare the polyimide polymer, the polyimide polymer can have high transparency, low chromaticity, a low coefficient of thermal expansion, high tensile strength and good elongation. In this way, the polyimide polymer of the invention can be applied to a flexible copper clad laminate (FCCL) or a transparent substrate for displays.

In addition, the polyimide polymer of the invention may exist in the form of a thin film, powder or solution or the like. In the following, an explanation is given of an example in which the polyimide polymer is in the form of a thin film.

Another embodiment of the invention provides a polyimide film including the polyimide polymer of any one of the aforementioned embodiments. In the present embodiment, based on a CIE L*a*b* color space, a value of b* of the polyimide film is about smaller than 3.5, preferably smaller than or equal to 3.0. In detail, a color component b* in the CIE L*a*b* color space represents a position between yellow and blue, wherein a negative value of b* indicates that the color inclines toward blue, and a positive value thereof indicates that the color inclines toward yellow. In view of this, when the value of b* of the polyimide film is smaller than 3.5, the polyimide film has high transparency and a low yellow index. In the present embodiment, elongation of the polyimide film is about greater than 10%. In the present embodiment, a thickness of the polyimide film is in the range of about 12 μm to 25 μm.

It is worth noting that, as mentioned above, since the polyimide polymer has high transparency, low chromaticity, a low coefficient of thermal expansion, high tensile strength and good elongation, the polyimide film similarly has high transparency, low chromaticity, a low coefficient of thermal expansion, high tensile strength and good elongation. In this way, the polyimide film of the invention can be applied to a flexible copper clad laminate (FCCL) or be applied as a transparent substrate in a display, and is therefore considerably improved in both applicability and commercial value.

Hereinafter, the features of the invention will be more specifically described with reference to Examples 1-5 and Comparative Example 1. Although the following Examples 1-5 are described, the materials used, the amounts and ratios thereof, the processing details, the processing procedures and so on can be suitably modified without departing from the scope of the invention. Accordingly, restrictive interpretation should not be made to the invention based on the examples described below.

Example 1

In a water bath (room temperature), 6.333 g (0.0298 mol, 65 mol %) of MTB and 4.695 g (0.0161 mol, 35 mol %) of 1,2,4BAPB were uniformly dissolved in 80 g of NMP as a solvent, thereby forming a diamine monomer mixed solution. In a water bath (room temperature), 9.000 g (0.0459 mol, 100 mol %) of CBDA was added to the diamine monomer mixed solution. Next, in a water bath (room temperature), a polyamide acid solution having a solid content of 20% was obtained after a reaction period of 24 hours.

Then, the polyamide acid solution was coated on a copper foil (having a thickness of 12 μm) by a blade coating method, and was subsequently baked at 140° C. for 10 minutes to remove NMP. Subsequently, the copper foil having the polyamide acid solution coated thereon was placed in a nitrogen environment at 300° C. to perform an imidization reaction (dehydrating cyclization) for 30 minutes, thereby obtaining a polyamide film disposed on the copper foil of Example 1. Finally, the copper foil was removed by an etching process, thereby obtaining the polyamide film of Example 1, on which a thickness measurement was made using a Litematic device (Litematic VL-50A, made by Mitutoyo America Corporation). And, the thickness of the polyamide film of Example 1 was measured to be about 15 μm.

Example 2

The polyamide film of Example 2 was produced by the same production process as in Example 1, and a main difference lies in that: the diamine monomers used in Example 2 included 65 mol % of TFMB and 35 mol % of 1,2,4BAPB, while the diamine monomers used in Example 1 included 65 mol % of MTB and 35 mol % of 1,2,4BAPB. In addition, the solid content of the polyamide acid solution and the thickness of the polyamide film of Example 2 are respectively shown in Table 1.

Example 3

The polyamide film of Example 3 was produced by the same production process as in Example 1, and a main difference lies in that: the diamine monomers used in Example 3 included 45 mol % of TFMB, 30 mol % of MTB and 25 mol % of 1,2,4BAPB, while the diamine monomers used in Example 1 included 65 mol % of MTB and 35 mol % of 1,2,4BAPB. In addition, the solid content of the polyamide acid solution and the thickness of the polyamide film in Example 3 are respectively shown in Table 1.

Example 4

The polyamide film of Example 4 was produced by the same production process as in Example 3, and a main difference is in the mole percentage of each diamine monomer, as shown in Table 1. In addition, the solid content of the polyamide acid solution and the thickness of the polyamide film in Example 4 are also respectively shown in Table 1.

Example 5

The polyamide film of Example 5 was produced by the same production process as in Example 3, and a main difference is in the mole percentage of each diamine monomer and the type of the dianhydride monomer, as shown in Table 1. In addition, the solid content of the polyamide acid solution and the thickness of the polyamide film in Example 5 are also respectively shown in Table 1.

Comparative Example 1

The polyamide film of Comparative Example 1 was produced by the same production process as in Example 1, and a main difference lies in that: the diamine monomers used in Comparative Example 1 included 60 mol % of TFMB and 40 mol % of MTB, i.e., no 1,2,4BAPB was used, while the diamine monomers used in Example 1 included 65 mol % of MTB and 35 mol % of 1,2,4BAPB. In addition, the solid content of the polyamide acid solution and the thickness of the polyamide film in Comparative Example 1 are respectively shown in Table 1.

TABLE 1

|  |  | Example 1 | Example 2 | Example 3 | Example 4 | Example 5 | Comparative Example 1 |
|---|---|---|---|---|---|---|---|
| Diamine monomer | TFMB (mol %)* | — | 65 | 45 | 50 | 45 | 60 |
|  | MTB (mol %)* | 65 | — | 30 | 40 | 30 | 40 |
|  | 1,2,4BAPB (mol %)* | 35 | 35 | 25 | 10 | 25 | — |
| Dianhydride monomer | CBDA (mol %)** | 100 | 100 | 100 | 100 | — | 100 |
|  | HPMDA (mol %)** | — | — | — | — | 100 | — |
| Solid content (%) of polyamide acid solution |  | 20 | 20 | 20 | 20 | 20 | 20 |
| Thickness (μm) |  | 15 | 15 | 15 | 15 | 15 | 15 |

*Unit mol % indicates: based on total mole number of the diamine monomers;
**unit mol % indicates: based on total mole number of the dianhydride monomers After that, measurements of color component b*, yellow index (YI), coefficient of thermal expansion (CTE), elongation, tensile strength and elastic modulus were made on each of the polyamide films of Examples 1-5 and Comparative Example 1. The above measurements are explained as follows and the measurement results are shown in Table 2.

<Measurements of Color Component b* and YI>

First of all, the polyamide films of Examples 1-5 and Comparative Example 1 were respectively made into film materials with length and width dimensions of 5 cm×5 cm. Next, the color component b* and the YI were measured using a spectrophotometer (Konica Spectrophotometer CM-2300D, made by Konica Minolta). In the standards set in industry, a value of b* of 0 to 3.5 means that the polyimide film has high transparency and a low yellow index. In the standards set in industry, a YI value of 0 to 6.16 means that the polyimide film has a low yellow index.

<Measurement of CTE>

First of all, the polyamide films of Examples 1-5 and Comparative Example 1 were respectively made into film materials with length and width dimensions of 2 mm×30 mm. Next, the film materials were heated from 30° C. to 400° C. using a thermomechanical analyzer (TMA) (EX-STAR 6000, made by Seiko Instrument Inc.) under conditions of a nitrogen environment and a temperature rise rate set to 10° C./min, and an average value of a dimension change amount between 50° C. and 200° C. was calculated to obtain the CTE. In the standards set in industry, the CTE is preferably less than or equal to 35 ppm/° C.

<Measurements of Tensile Strength, Elongation and Elastic Modulus>

First of all, the polyamide films of Examples 1-5 and Comparative Example 1 were respectively made into film materials with length (gauge length) and width dimensions of 25.4 mm×3.2 mm and in a shape of a dumbbell or a dog bone. Next, the tensile strength (MPa), the elongation (%) and the elastic modulus (GPa) of the film materials were measured using a universal testing machine (AG-1S, made by Shimadzu Scientific Instruments).

Tensile strength indicates the maximum strength that a film material can withstand during stretching. Specifically, the tensile strength was the maximum engineering stress when the film material was stretched to a tensile length without breaking under the condition that the initial tensile strength was set to zero, wherein a greater value of the tensile strength indicates a better mechanical characteristic.

Elongation indicates a deformation degree when a film material is broken by stretching. Specifically, the elongation was a deformation amount obtained when the film material was broken by stretching under the condition that the initial tensile strength was set to zero, wherein a greater value of the elongation indicates a better mechanical characteristic. In the standards set in industry, the elongation is preferably greater than 10%.

Elastic modulus (also called Young's Modulus) is an indicator of how difficult it is to cause elastic deformation in a film material. A greater value of the elastic modulus indicates that the required stress for elastic deformation is greater, i.e., stiffness of the material is greater; a smaller value of the elastic modulus indicates better flexibility or softness.

TABLE 2

|  | Example 1 | Example 2 | Example 3 | Example 4 | Example 5 | Comparative Example 1 |
|---|---|---|---|---|---|---|
| b* | 3.45 | 2.87 | 3.00 | 2.74 | 3.02 | 3.20 |
| YI | 6.07 | 5.04 | 5.27 | 4.81 | 5.31 | 5.63 |
| CTE (ppm/° C.) | 23 | 35 | 29 | 26 | 31 | 17 |
| Elongation (%) | 12 | 13 | 15 | 10.0 | 14 | 6.4 |
| Tensile strength (MPa) | 157 | 147 | 169 | 175 | 165 | 166 |
| Elastic modulus (GPa) | 5.9 | 4.7 | 6.0 | 6.2 | 5.8 | 4.8 |

From Table 1, it is clear that the polyamide films of Examples 1-5 had good performance in all of color component b*, YI, CTE, elongation, tensile strength and elastic modulus. This means that, by using 1,2,4BAPB and the at least one aromatic group-containing diamine other than 1,2,4BAPB to perform the imidization reaction with the tetracarboxylic dianhydride containing the aliphatic structure to thereby prepare the polyimide polymer, the polyimide polymer and the polyimide film can have high transparency, low chromaticity, a low coefficient of thermal expansion and good mechanical characteristics.

In addition, from Table 1, it is clear that as compared with the polyamide film of Comparative Example 1 that did not use 1,2,4BAPB as a diamine monomer, the polyamide films of Examples 1-5 that used 1,2,4BAPB as a diamine monomer had significantly improved elongation while maintaining good performance in color component b*, YI, CTE, elongation, tensile strength and elastic modulus. This means that, by using 1,2,4BAPB and the at least one aromatic group-containing diamine other than 1,2,4BAPB to perform the imidization reaction with the tetracarboxylic dianhydride containing the aliphatic structure to thereby prepare the polyimide polymer, the elongation of the polyimide polymer and the polyimide film can be improved.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A polyimide polymer, comprising a repeating unit represented by formula 1:

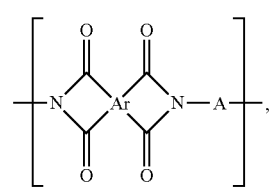

formula 1 wherein Ar is a tetravalent organic group derived from a tetracarboxylic dianhydride containing an aliphatic structure; and A comprises

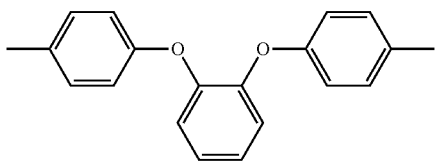

and at least one divalent organic group derived from an aromatic group-containing diamine other than

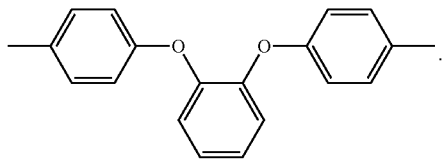

2. The polyimide polymer according to claim 1, wherein the at least one divalent organic group derived from the aromatic group-containing diamine comprises at least one of a divalent organic group derived from a diamine having a fluorine-containing aromatic group and a divalent organic group derived from a diamine containing an aromatic group and an aliphatic structure.

3. The polyimide polymer according to claim 2, wherein the diamine having the fluorine-containing aromatic group comprises 2,2'-bis(trifluoromethyl)-4,4'-diaminobiphenyl (TFMB), 4,4'-diamino-2,2'-bis(trifluoromethyl)diphenyl ether, 1,4-bis{4-amino-2-(trifluoromethyl)phenoxy}benzene, 2,2-bis{4-(4-aminophenoxy)phenyl}hexafluoropropane, 2,2'-bis[4-(4-amino-2-trifluoromethylphenoxy)-phenyl]hexafluoropropane, or 2,2'-bis(4-aminophenyl)hexafluoropropane.

4. The polyimide polymer according to claim 2, wherein the diamine containing the aromatic group and the aliphatic structure comprises 4,4'-diamino-2,2'-dimethyl biphenyl (MTB), 4,4'-diamino-3,3'-dimethyl biphenyl, 2,2'-bis[4-(3-aminophenoxy)pheny]propane, or 4,4'-(1,3-phenylenediisopropylidene) bisaniline.

5. The polyimide polymer according to claim 1, wherein based on total mole number of

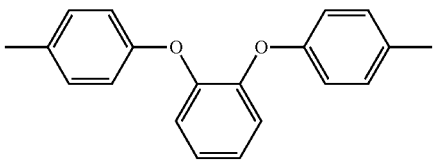

and the at least one divalent organic group derived from the aromatic group-containing diamine, a mole percentage of

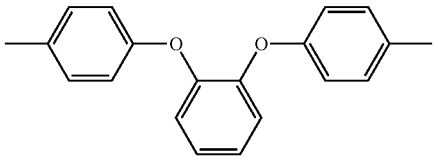

is 10% to 35%.

6. A polyimide film comprising the polyimide polymer according to claim 1.

7. The polyimide film according to claim 6, wherein based on a CIE L*a*b* color space, a value of b* of the polyimide film is smaller than 3.5.

8. The polyimide film according to claim 6, wherein elongation of the polyimide film is greater than 10%.

* * * * *